United States Patent
Klausmeyer et al.

(10) Patent No.: US 9,545,354 B1
(45) Date of Patent: Jan. 17, 2017

(54) HYDRAULICALLY ADJUSTABLE WALKER

(71) Applicants: William Cyrus Klausmeyer, Swanville, ME (US); Peter William Klausmeyer, Morrill, ME (US); Ryan William Andrew, Dartmouth, MA (US)

(72) Inventors: William Cyrus Klausmeyer, Swanville, ME (US); Peter William Klausmeyer, Morrill, ME (US); Ryan William Andrew, Dartmouth, MA (US)

(*) Notice: Subject to any disclaimer, the term of this patent is extended or adjusted under 35 U.S.C. 154(b) by 0 days.

(21) Appl. No.: 15/097,544

(22) Filed: Apr. 13, 2016

(51) Int. Cl.
*A61H 3/00* (2006.01)

(52) U.S. Cl.
CPC .......... *A61H 3/00* (2013.01); *A61H 2003/001* (2013.01); *A61H 2201/5051* (2013.01)

(58) Field of Classification Search
CPC .............. A61H 3/00; A61H 2003/001; A61H 2201/5051
USPC .......................................... 135/67; 248/188.3
See application file for complete search history.

(56) References Cited

U.S. PATENT DOCUMENTS

| | | | | | |
|---|---|---|---|---|---|
| 2,598,875 | A | * | 6/1952 | Anderson | E06C 7/44 182/202 |
| 2,908,472 | A | * | 10/1959 | McDonald | B60G 21/106 180/9.5 |
| 3,157,188 | A | * | 11/1964 | Farnham | A61H 3/02 135/69 |
| 3,795,378 | A | * | 3/1974 | Clarke | F16M 11/32 248/168 |
| 3,800,815 | A | * | 4/1974 | Birk | A61H 3/00 135/67 |
| 5,649,558 | A | * | 7/1997 | Richard | A61H 3/00 135/67 |
| 7,703,465 | B2 | * | 4/2010 | Diamond | A45B 7/00 135/67 |
| 9,119,757 | B2 | * | 9/2015 | Triolo | A61H 3/00 |
| 9,358,175 | B2 | * | 6/2016 | Bordan | A61H 3/00 |
| 2012/0298160 | A1 | * | 11/2012 | Hamilton | A61H 3/00 135/66 |

* cited by examiner

*Primary Examiner* — Noah Chandler Hawk
(74) *Attorney, Agent, or Firm* — Jeffrey Joyce; Patricia Mathers

(57) ABSTRACT

A hydraulically adjustable walker including a frame that includes a plurality of telescoping legs and a leg adjustment assembly that includes at least one valve and at least one tube that delivers hydraulic fluid into the legs and allows a user to control the length of each leg. The legs of the walker are hydraulically adjustable, so that the front legs may be shortened and the back legs extended, or two side legs shortened and the two opposing side legs extended, so as to allow the walker to be securely placed on two different steps.

7 Claims, 8 Drawing Sheets

HYDRAULICALLY ADJUSTABLE WALKER

BACKGROUND INFORMATION

Field of the Invention

The invention relates to walkers and other similar devices that assist people in the act of walking and climbing stairs.

Discussion of Prior Art

The conventional walker is a well-known device that has a U-shaped frame formed by two pairs of legs that define the sides of the walker, each pair having a front leg and a rear leg that are connected at the top by a grip bar and a crossbar that connects the two front legs, thereby forming an opening or well for a person to stand in. The walker is typically about waist high, with the front slightly wider than the width of the user. The two sides are approximately 12 inches deep at the grip bar, i.e., the front and rear legs are approximately 12 inches apart at the top, but the distance between the legs gradually increases in the direction of the floor, for reasons of stability. A user uses the walker by standing in the well, gripping the grip bar, and pushing or moving the walker forward approximately the distance of a normal step, and then stepping into the well, to repeat the pushing motion, all the while holding on to the grip bars.

While the standard walker works well on flat and smooth surfaces, it is not as useful when climbing stairs, because the distance between the front and rear legs is significantly greater than the depth of a step on a standard staircase. The fact that the legs of the walker don't all fit on a single step makes it difficult for a user to pause for a rest when going up or down a staircase. When ascending a staircase, the user can lean into the walker for support, but descending a staircase with a walker is a treacherous adventure for the user, because the walker is always in danger of tumbling down the stairs, unless the user holds it in place. Manual adjustments to the lengths of the legs are sometimes possible, however, this requires a tedious process of turning the walker upside down and manually adjusting each leg. In effect, using a conventional walker on a staircase requires more strength, balance, and skill than the typical user is able to exert.

Some walkers deploy mechanical systems to raise or lower the front or rear legs, and this allows the walker to remain in a stable position while supported on two adjacent steps. However, these walkers only allow for the front legs or the rear legs to move in tandem and do not allow for individual leg movement or side-only leg movement. The known walkers also implement mechanical mechanisms that include relatively heavy equipment and are often cumbersome to operate.

What is needed, therefore, is a light weight walker with legs that are independently adjustable. What is further needed is such a walker that is easy to operate.

BRIEF SUMMARY OF THE INVENTION

The invention is a hydraulically adjustable walker having a plurality of legs that are independently adjustable and in which the front legs, rear legs, or side legs may be easily adjusted in pairs to, for example, climb or descend stairs. In the embodiment shown the walker according to the invention is a traditionally shaped walker with telescoping legs, making it possible to position the walker on two steps, either with the front legs on one step and the rear legs on a lower step, or sidewise, with one side on one step and the other side on the lower step. Depending on the width of the stairs it is possible that additional steps may separate the legs. Tubes that are filled with a non-compressible, i.e., hydraulic, fluid, such as water, extend through the frame and into the legs. Each of the four legs has telescoping ends that provide for enough extension to span the height of any reasonably spaced steps.

The tubes are pre-filled with an amount of hydraulic fluid that is sufficient for all four legs to be extended to the same length for normal walking. The tubes extend through the upper portion of the frame and extend into the upper telescoping end of the each telescoping leg, allowing the fluid to move between any and all legs. The tube ends in the upper section of the telescoping leg allowing the fluid to pass into the lower extension and forcing the telescoping section to extend. In this mode, the grip bars on the walker are approximately as high as the user's waist. Handgrips are provided on the grip bars and valves are provided near the hand grips to control the flow of fluid through the tubes. Closing the valves prevents the fluid from flowing from one leg to another, thereby locking the legs in position. Opening the valves allows the fluid to flow through the tubes and into, or out of, the telescoping leg extensions.

To adjust the length of the legs the user opens the valves and then applies a small amount of pressure to the walker in the direction that he wishes to shorten the legs. For example, to walk straight up a set of stairs, the user opens the valves and leans forward on the walker to force the front legs to compress inward. Shortening the front legs causes the rear legs to extend outward the corresponding length. The user then lifts the walker on to a first set of steps, with the front legs resting securely on the higher step and the rear legs resting firmly on the lower step. When used on a standard size stair case, the device is sized such that one step separates the retracted legs from the extended legs. The user then closes the valves to lock the fluid in position and steps onto the staircase.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
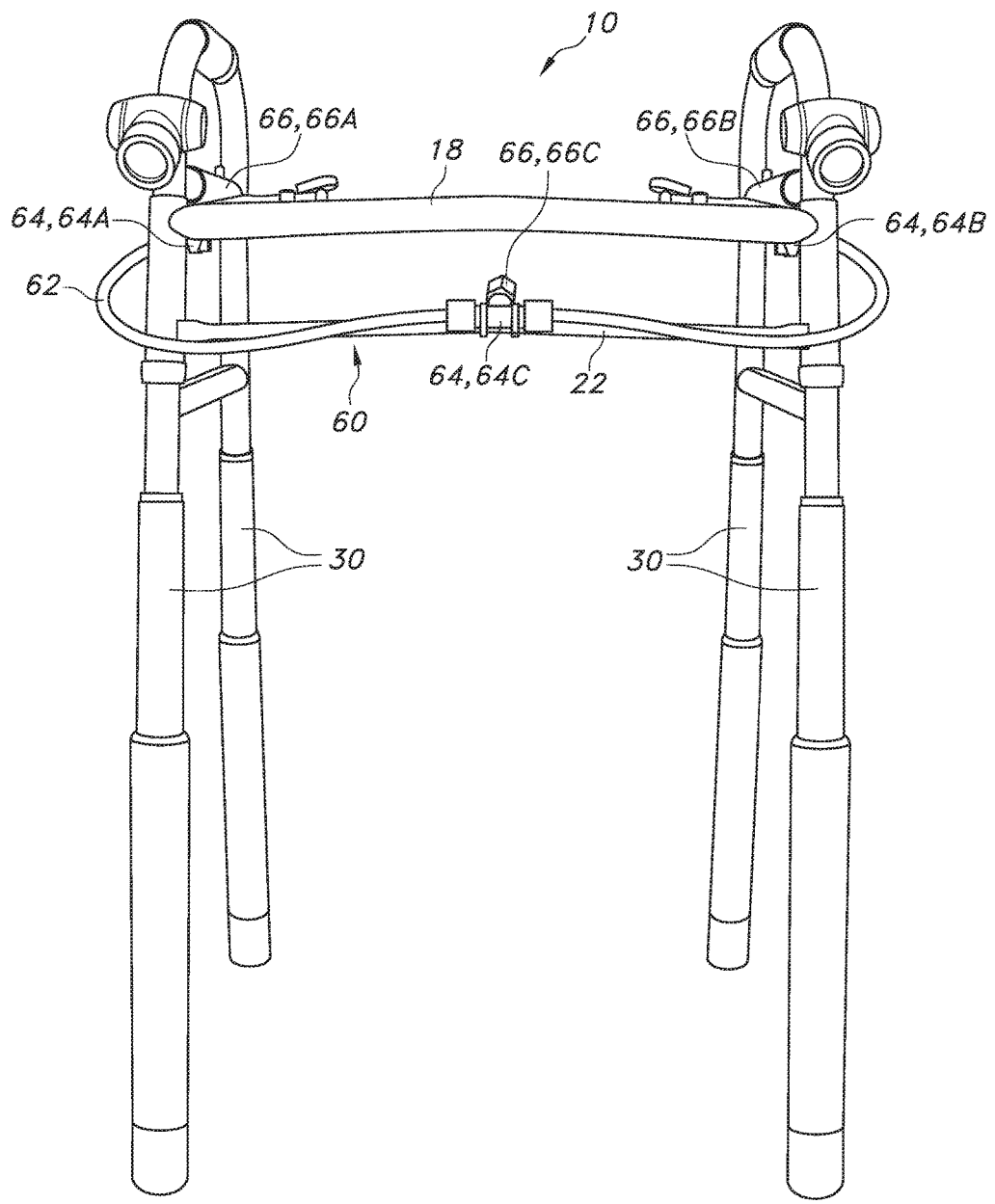
FIG. 1 is a front view of the walker according to the invention in the normal walking position.
Figure 2:
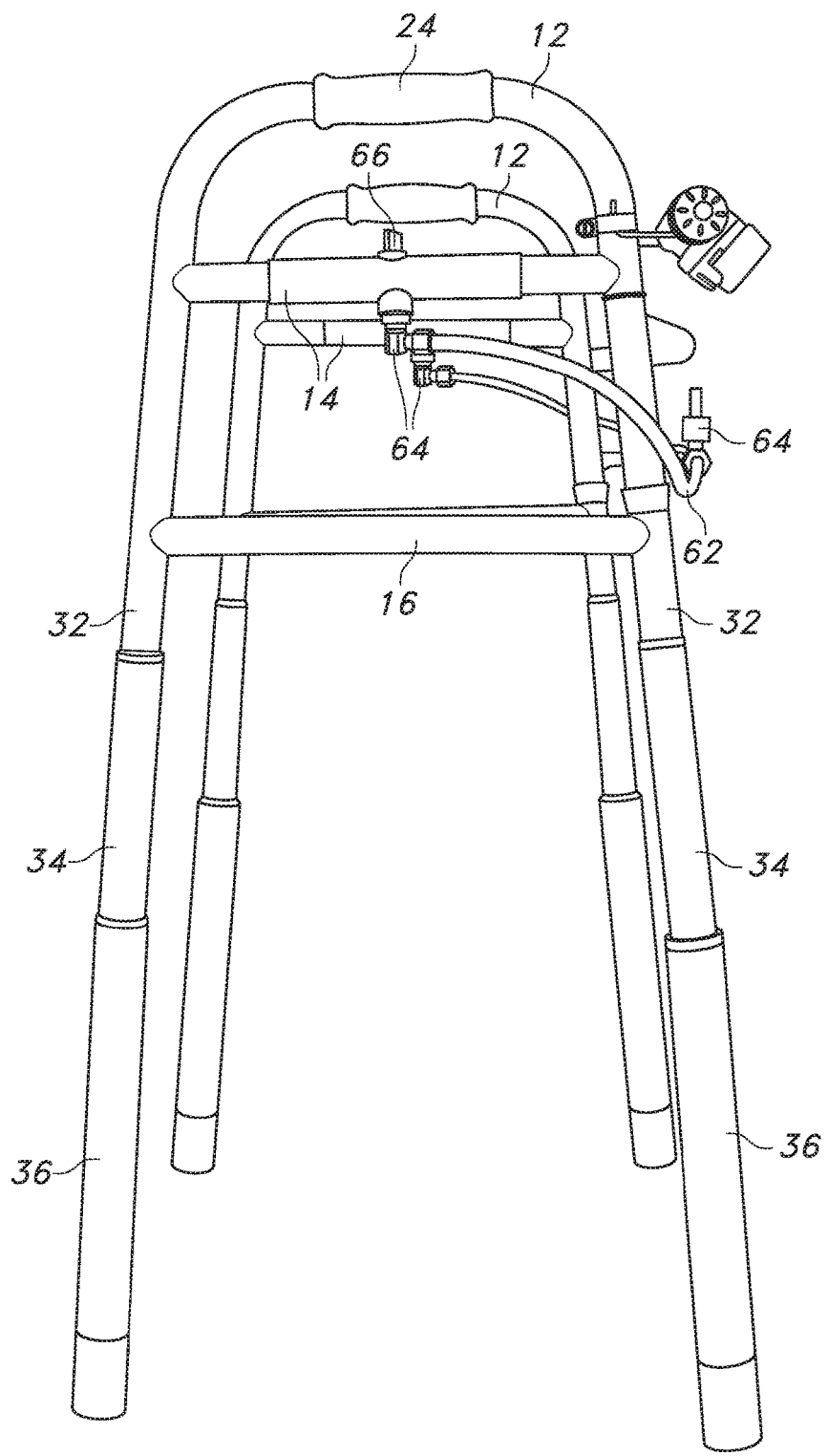
FIG. 2 is a side view of the walker in the normal walking position.
Figure 3:
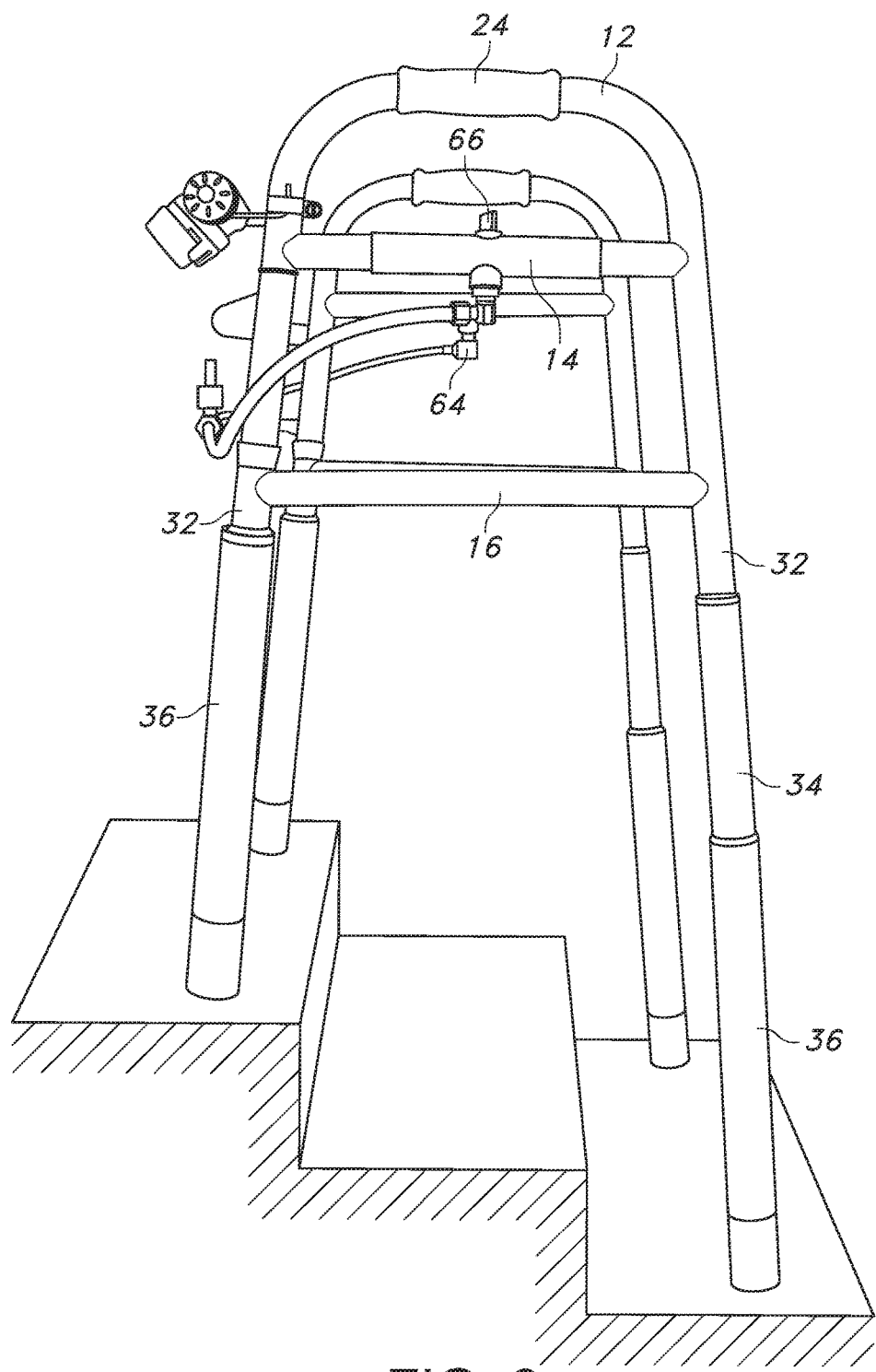
FIG. 3 is a side view of the walker with the front legs retracted and the rear legs extended, placed on a staircase.
Figure 4:
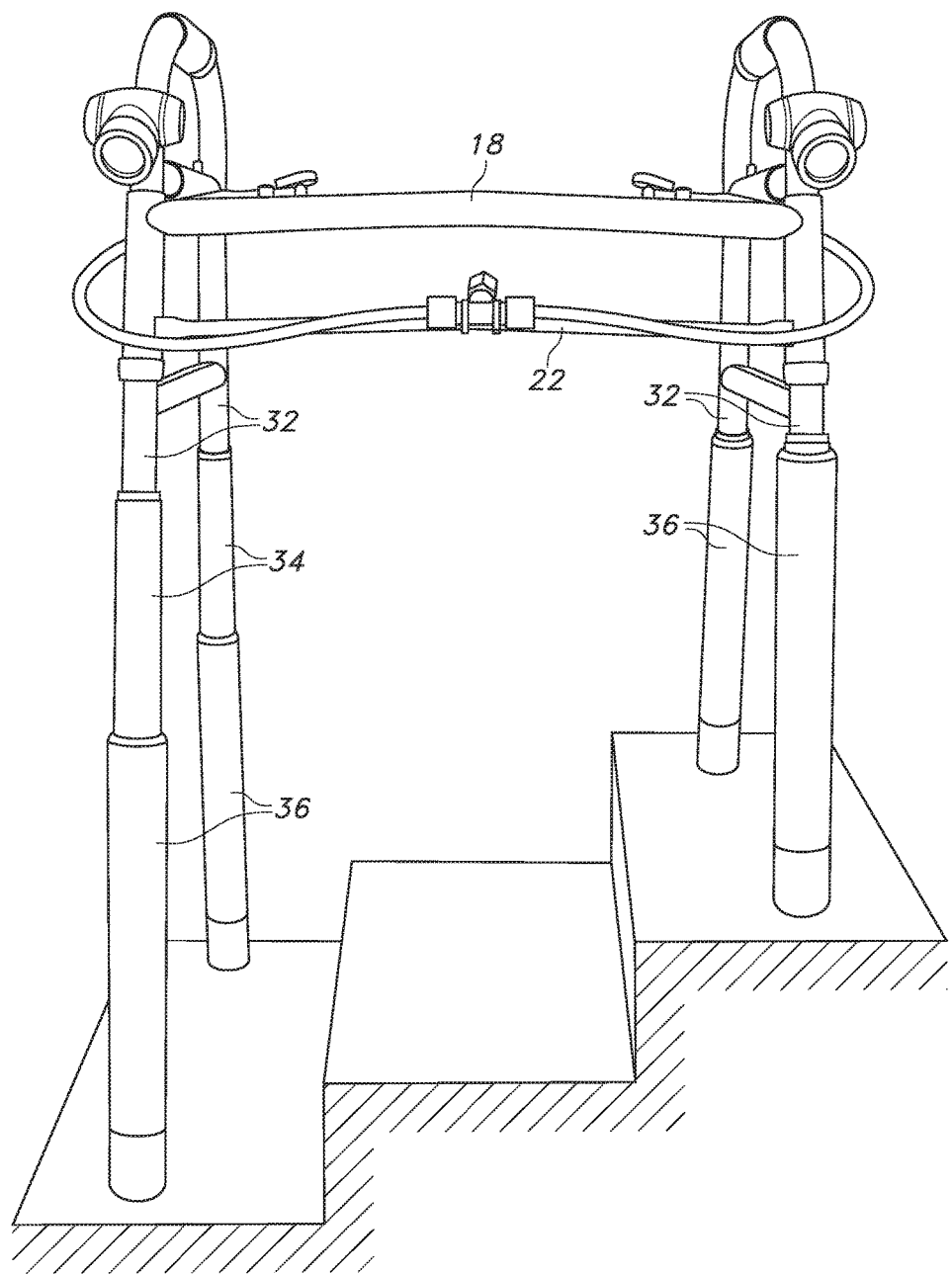
FIG. 4 is a front view of the walker with one set of side legs extended and the other retracted, placed sideways on a staircase.
Figure 5:
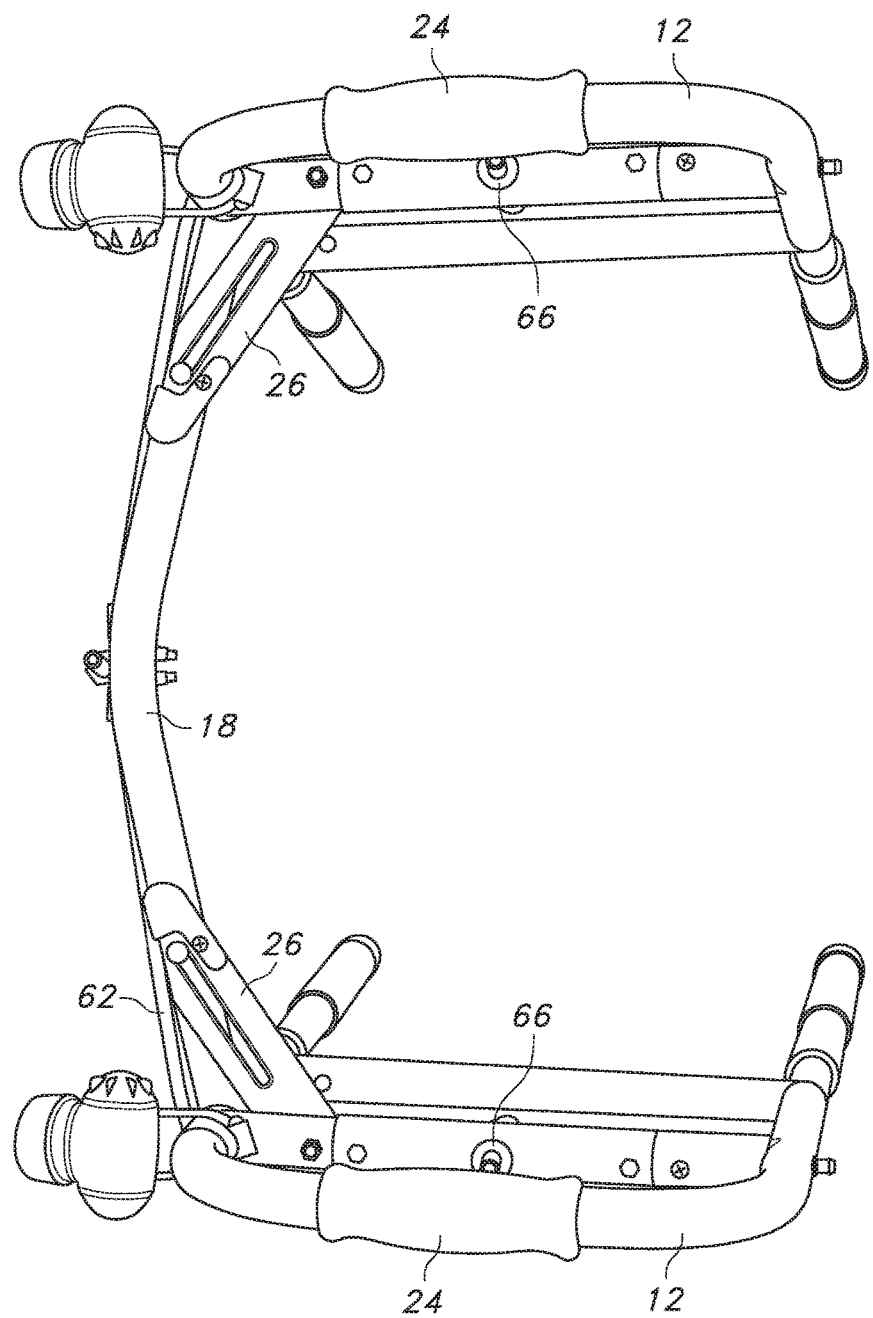
FIG. 5 is a top view of the walker.
Figure 6:
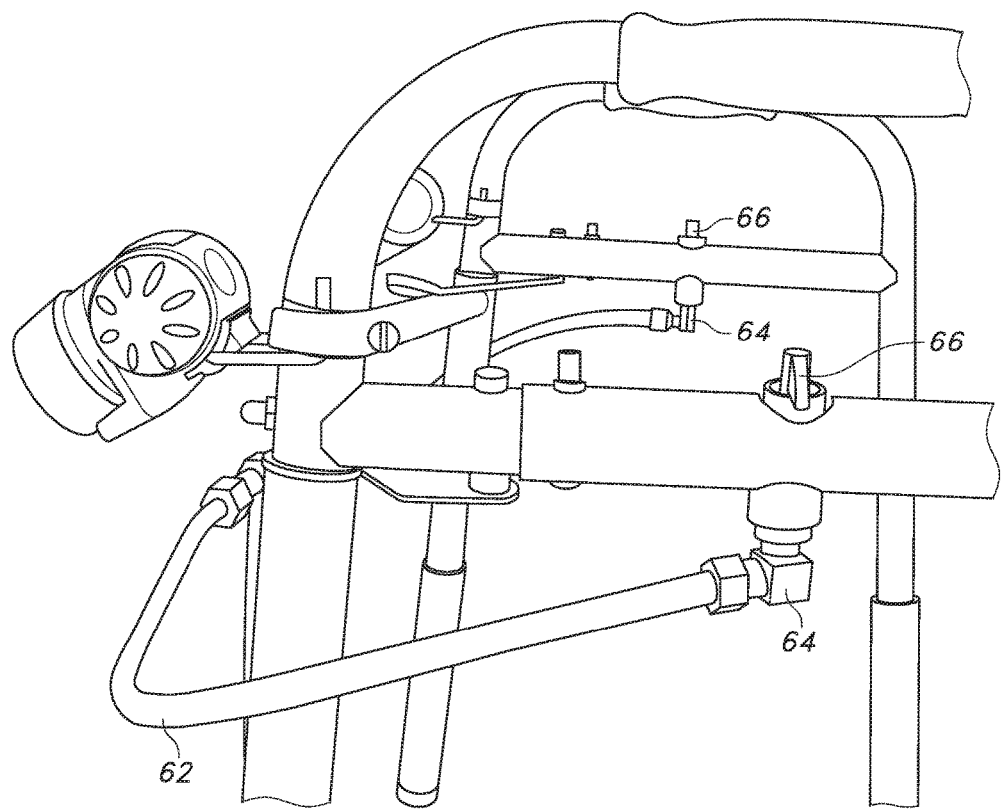
FIG. 6 is a side view of the upper portion of the device showing a portion of the valve system.

FIGS. 1-6 illustrate a hydraulically adjustable walker device 100 according to the invention comprising a frame 10 with length-adjustable legs 30 and a fluid delivery system 60 for changing the lengths of the legs 30. The frame 10 includes upper sidebars 12, middle sidebars 14 and lower sidebars 16 along with upper crossbar 18 and lower crossbar 22. The sidebars 12, 14, 16, connect a front length-adjustable leg 30 to a rear length-adjustable leg 30, and the crossbars 18, 22, connect the front length-adjustable legs 30, forming an opening or well for a person to stand in. Hand grips 24 may be provided for the user's comfort and safety. In normal use, the user grips the hand grips 24 and walks into the well of the walker, pushes or picks up the walker and moves it a short distance forward, and then walks forward to place him- or herself in the well again.

The fluid delivery system 60 includes a series of tubes 62 that are filled with a non-compressible, i.e. hydraulic, fluid (not shown), valves 64, and activation levers 66. The tubes 62 extend through the middle sidebars 14 and into the top of the length-adjustable legs 30. Another tube 62 connects the tubes 62 in the middle sidebars 14, allowing fluid to pass from one length adjustable leg 30 to any other leg 30 or legs 30.

The valves 64 control the flow of fluid through the tubes. When the valves 64 are closed the fluid is unable to move and the legs 30 are effectively in a locked position and unable to change in length. Opening the valves 64 allows the fluid to move through the tubes 62. The activation levers 66 allow a user to easily open and close the valves 64.

Once the levers are open a user is able to adjust the height of the legs 30 by applying a small amount of pressure in the direction of the leg 30 or legs 30 he wishes to retract, which forces the hydraulic fluid out of the retracted leg 30 or legs 30 through the fluid delivery system 60 to the other legs 30 which are then forced to extend. The tubes 62 are pre-filled with an amount of hydraulic fluid that may vary depending on the desired height of the device 100.

Each telescoping leg 30 includes an upper section 32, middle section 34 and lower section 36. As the fluid flows through the tubes 62 into the upper section 32 of the leg 30 it exits the tube 62 and passes through the upper section 32, into the middle section 34 and then into the lower section 36 until it reaches the bottom of the lower section 36, which is closed, at which point the lower section 36 telescopes outward, thereby extending the length of the leg 30. As the user continues to apply pressure to legs that are to be retracted, the lower section 36 of the legs to be lengthened continues to extend until it has reached its limit, at which time the middle section 34 begins to extend. Once the desired leg length is reached the user stops applying pressure and turns the levers 66 to close the valves 64 to lock the walker 100 into the desired position.

Figure 7:
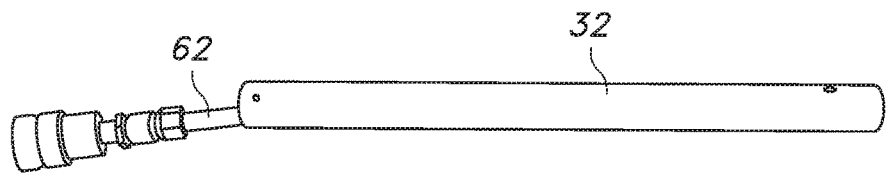
FIG. 7 is a side view of the upper section of the telescoping leg.
Figure 8:
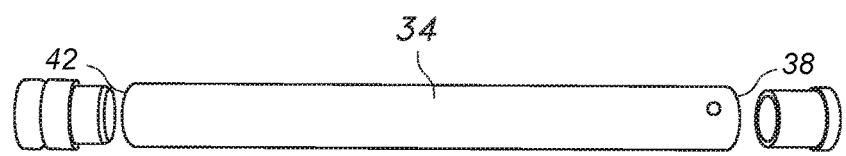
FIG. 8 is a side view of the middle section of the telescoping leg.
Figure 9:
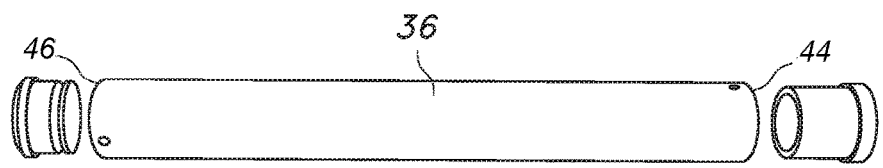
FIG. 9 is a side view of the lower section of the telescoping leg.
Figures 10, 11:
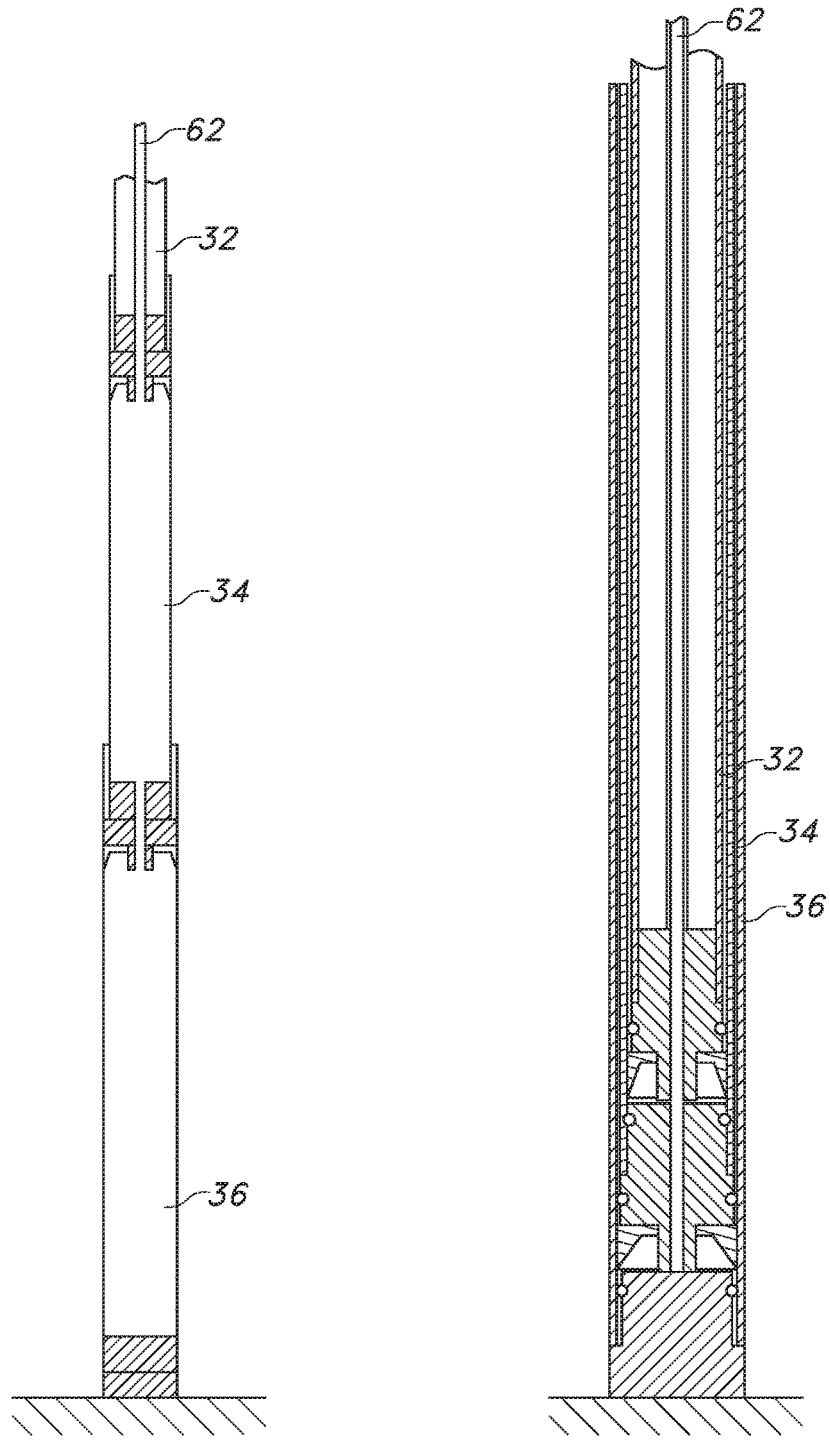
FIG. 10 is a cross-sectional view of a leg in an extended position.
FIG. 11 is a cross-sectional view of a leg in a retracted position.

FIGS. 7-11 illustrate the telescoping legs 30, including the upper leg section 32, the middle leg section 34 and the lower leg section 36. The upper section 32 is fixedly attached to frame 10. The tube 62 extends out from the frame 10 into the upper section 32. The middle section 34 has an open upper end 38 that fits over upper section 32 and an open lower end 42 that fits within the lower section 36. Common seals (not shown), such as O-rings, are provided on each end to allow for watertight movement of the middle section 34. The lower section 36 has an open upper end 44 and a closed lower end 46. The lower end 46 supports the device 100 on the walking surface and may be covered with a rubber pad or other device or substance that is intended to provide a grip or buffer beneath the device 100. The upper end 44 for the lower section 36 fits over the lower end 42 of the middle section 34 and has a common seal (not shown) such as an O-ring to support water-tight movement of the lower section 36 over the middle section 34.

The embodiment shown includes two front legs 30, two rear legs 30, and three levers 66A, 66B, 66C and three valves 64A, 64B, 64C. If the user wants to adjust the device frontwards or backwards only valves 64A and 64B need to be opened in order to allow the fluid to pass from a front leg to a rear leg or vice versa. If the user wishes to compress one side of the device 100 the third valve 64C also needs to be opened to allow the fluid to pass from one side to the other. Similarly, if the user wishes to retract one leg 30 while extending the other three legs 30, each valve is opened and the user applies pressure in the direction of the one leg 30 to retract that leg 30. The fluid flows into the other three legs 30, causing them to extend a proportional fraction of the distance the one leg has been shortened. The number of valves 64 may vary, depending on the degree of control that is desired. The frame 10 is foldable and guide tracks 26 allow the sides of the frame to fold in towards the front of the frame for ease of storage.

A lightweight overflow water tank (not shown) may be provided to allow for the easy addition or removal of water from the leg extension mechanism. The ability to change the volume of fluid in the delivery system 60 enables easy adjustment of the normal height of the walker, so that the same walker may be comfortably used by people of different heights. The tank is affixed to the frame and may be any suitable container that holds water. The tank has an opening to allow for the addition or removal of water, and is connected by a tube to the fluid delivery system 60 and an additional valve to allow the user to turn the flow of water on and off.

It is understood that the embodiments described herein are merely illustrative of the present invention. Variations in the construction of the walker may be contemplated by one skilled in the art without limiting the intended scope of the invention herein disclosed and as defined by the following claims.

What is claimed is:

1. A hydraulically adjustable walker comprising:
   a frame having a front and two sides, the frame formed by four legs and connecting bars that connect one leg with an adjacent leg, each leg being length-adjustable and having at least an upper section having a first diameter and a lower section having a second diameter that is larger than the first diameter adjustably coupled to the upper section, each leg further comprising a middle section placed between the upper section and lower section, the middle section having a third diameter that is larger than the first diameter and smaller than the second diameter, and wherein the middle section is adjustably coupled on the upper section and the lower section is adjustably coupled on the middle section; and
   a fluid delivery system that includes a one or more tubes that extend through the frame and into the four legs and one or more valves;
   wherein the tubes are filled with hydraulic fluid and wherein closing the valves prevents the fluid from moving and keeps the legs at a fixed length;

wherein the lower section is slidably movable on the upper section;

wherein fluid flowing into the middle and lower sections forces at least the lower section to extend downward from the middle section; and wherein opening the valves allows the fluid to move throughout the tubes selectively from front legs to back legs or from one pair of side legs to the other pair of side legs, thereby allowing the user to adjust the length of the legs by applying pressure to a portion of the frame to shorten one or more of the legs and lengthen one or more of the legs.

2. The walker of claim 1, wherein the tubes extend into the upper section of the legs;

wherein the upper section has an open top end, the middle section has an open top end and an open bottom end, and the lower section has an open top end and closed bottom end; and wherein the fluid exits the tube into the upper section, passes through the middle section and into the lower section and forces the lower section to extend outward from the upper section when it reaches the closed bottom end of the lower section.

3. The walker of claim 2, wherein the frame includes a sidebar that connects a front leg with a rear leg, and wherein the fluid delivery system tubes extend through the sidebar and into the upper section of the respective front and rear legs.

4. The walker of claim 3 including hand grips on the sidebars.

5. The walker of claim 2 wherein the frame is foldable.

6. The walker of claim 5, wherein the two sides of the frame are hingedly connected to the front of the frame and wherein the two sides are foldable against the front.

7. The walker of claim 1, wherein the fluid delivery system includes at least three valves, at least one valve between each adjacent leg and at least one valve between each side of the walker.

* * * * *